Figure 9:
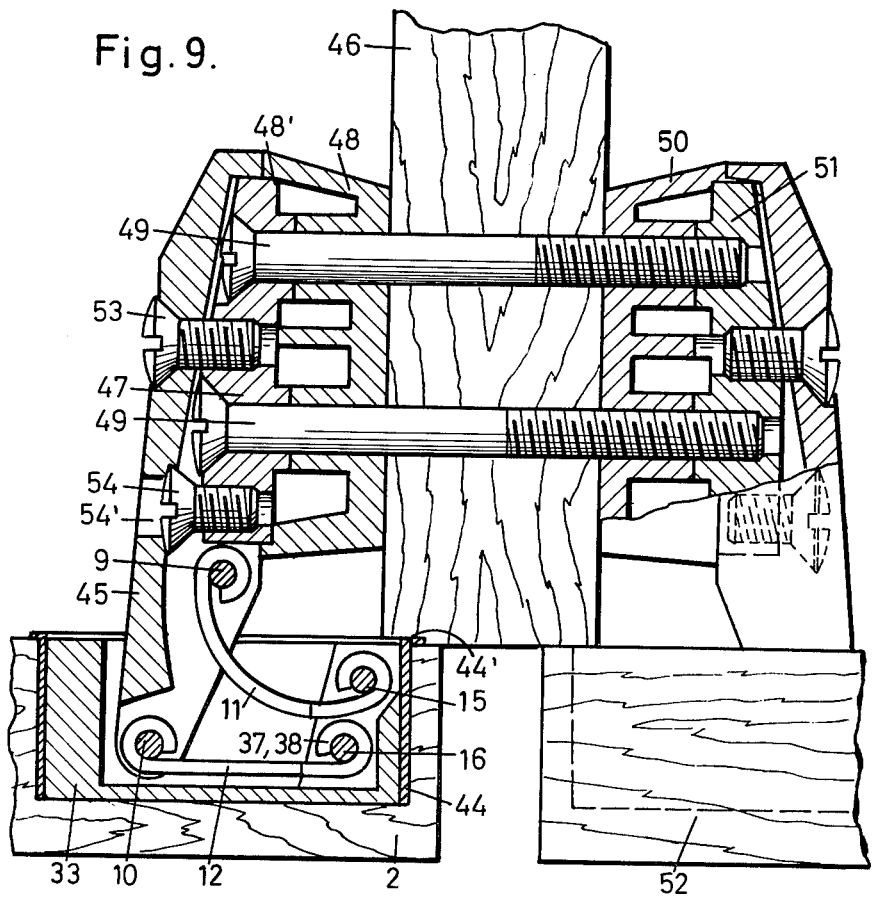

Dec. 21, 1965  R. HEINZE  3,224,035
HINGES
Filed Jan. 17, 1963  8 Sheets-Sheet 1
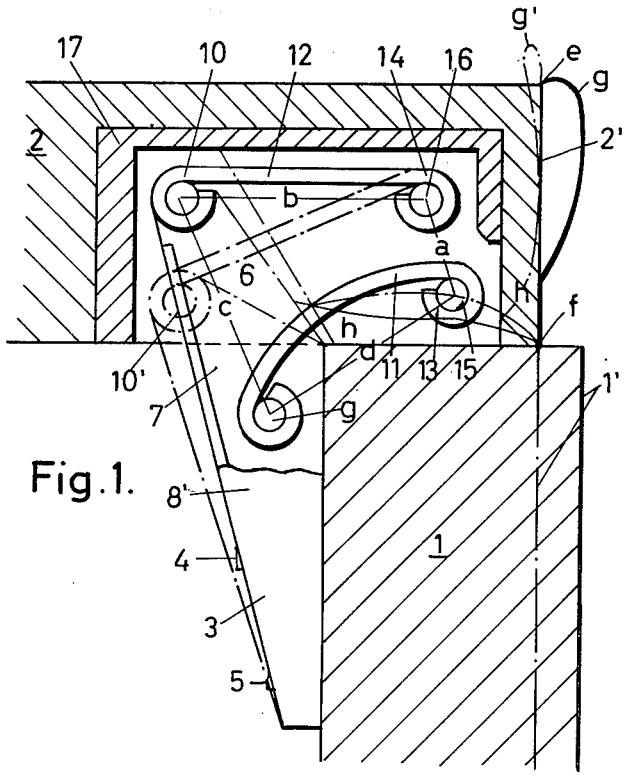
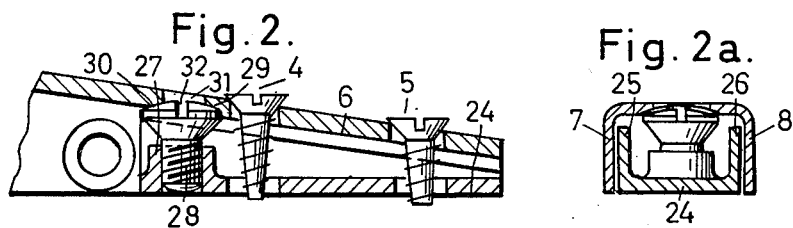
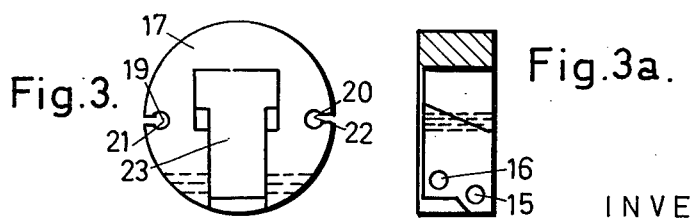
INVENTOR:
Richard Heinze
By
Maxwell E. Sparrow
Attorney Dec. 21, 1965  R. HEINZE  3,224,035
HINGES
Filed Jan. 17, 1963  8 Sheets-Sheet 2
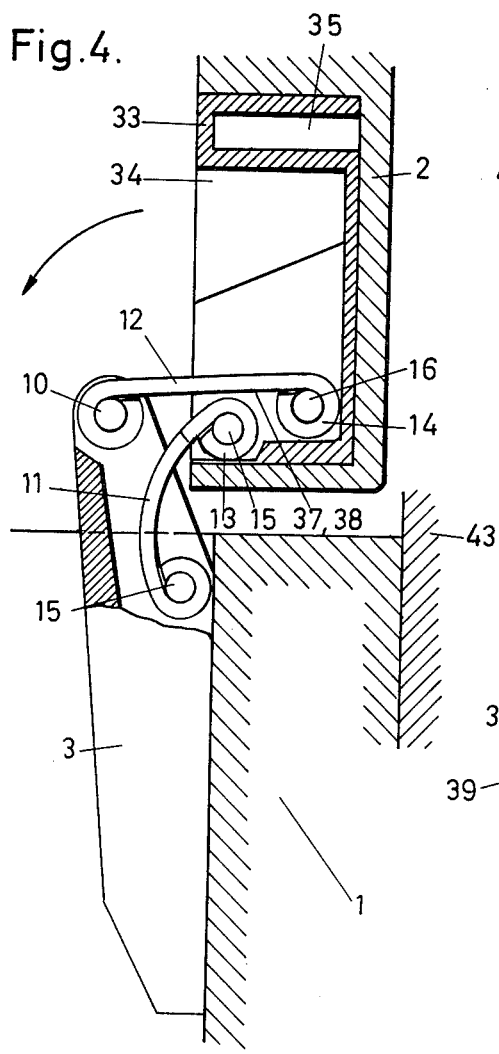
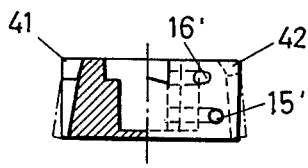
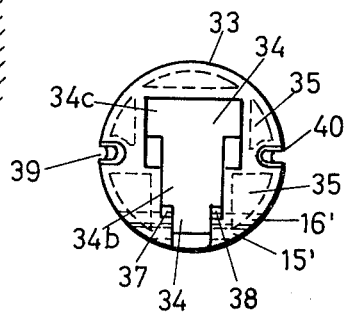
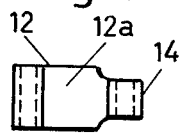
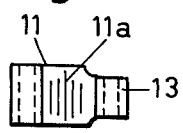
INVENTOR:
Richard Heinze
By
Maxwell E. Sparrow
Attorney Dec. 21, 1965    R. HEINZE    3,224,035
HINGES
Filed Jan. 17, 1963    8 Sheets-Sheet 3

INVENTOR:
Richard Heinze
By
Maxwell E. Sparrow
Attorney

Dec. 21, 1965    R. HEINZE    3,224,035
HINGES

Filed Jan. 17, 1963    8 Sheets-Sheet 4

INVENTOR:
Richard Heinze
By
Maxwell E. Sparrow
Attorney

Dec. 21, 1965  R. HEINZE  3,224,035
HINGES
Filed Jan. 17, 1963  8 Sheets-Sheet 5

INVENTOR:
Richard Heinze
By Maxwell E. Sparrow
Attorney

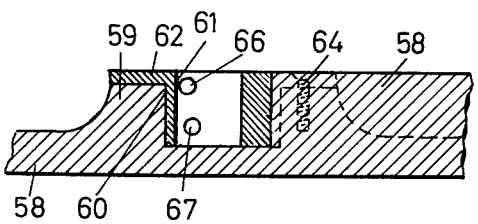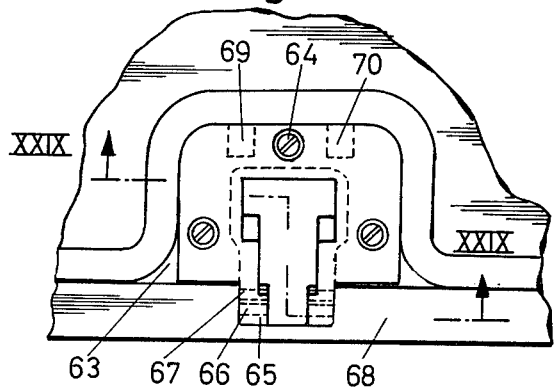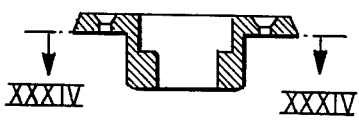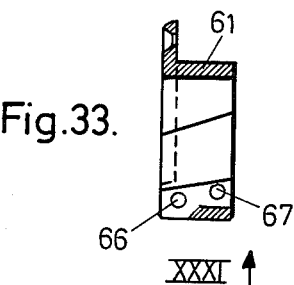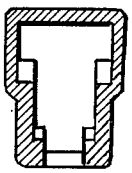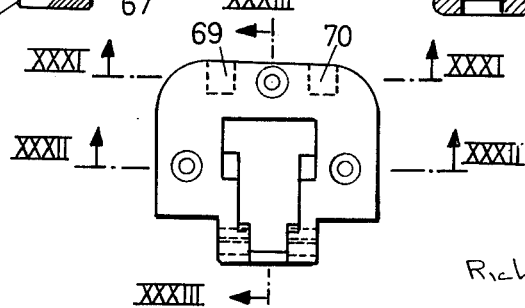

Dec. 21, 1965  R. HEINZE  3,224,035
HINGES
Filed Jan. 17, 1963  8 Sheets-Sheet 7
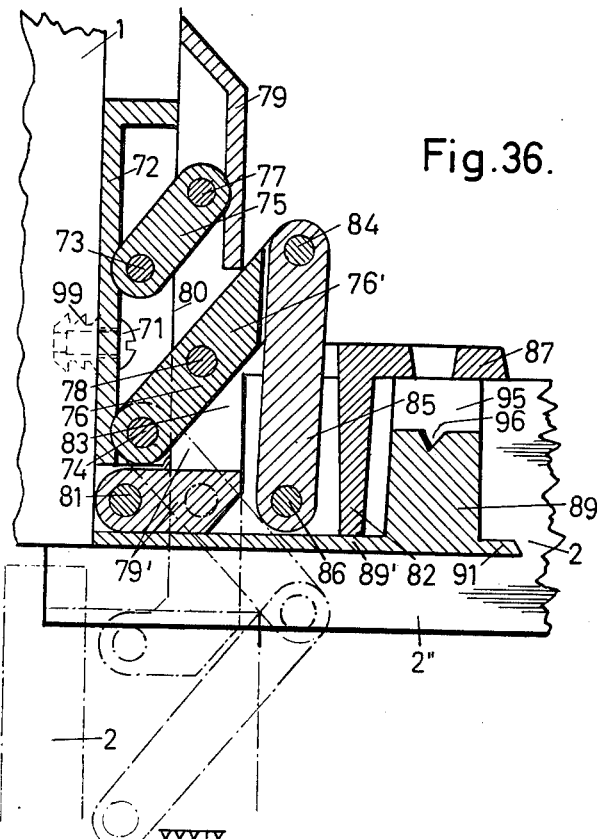
Fig.36.
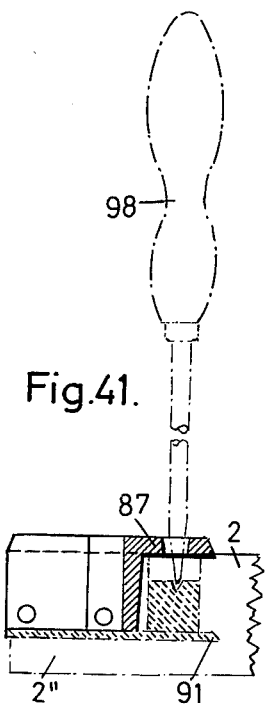
Fig.41.
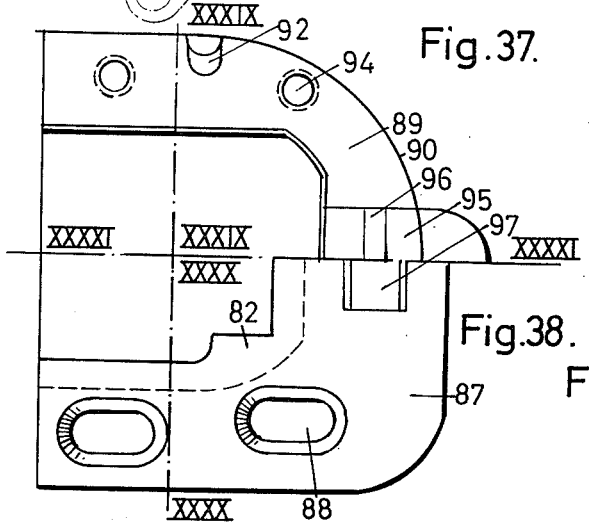
Fig.37.
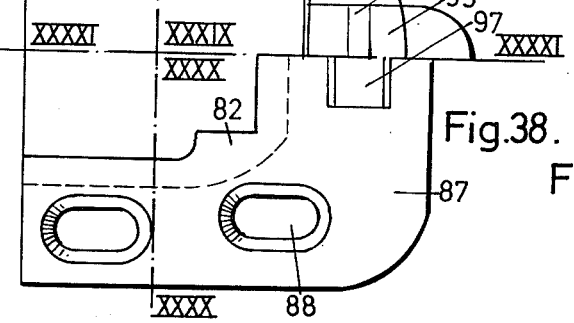
Fig.38.
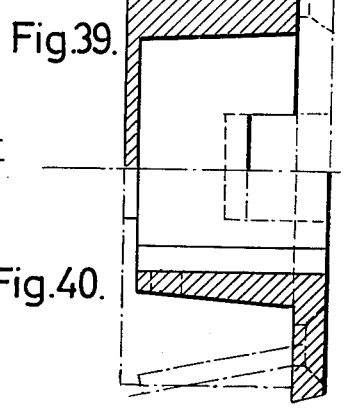
Fig.39.
Fig.40.
INVENTOR:
Richard Heinze
By Maxwell E. Sparrow
Attorney Dec. 21, 1965   R. HEINZE   3,224,035
HINGES Filed Jan. 17, 1963   8 Sheets-Sheet 8

INVENTOR:

Richard Heinze

By

Maxwell E. Sparrow
Attorney

3,224,035
HINGES
Richard Heinze, Herford, Westphalia, Germany
Filed Jan. 17, 1963, Ser. No. 252,220
Claims priority, application Germany, Jan. 18, 1962,
H 44,656; May 14, 1962, H 45,773; Aug. 23, 1962,
H 46,724; Sept. 26, 1962, H 47,008; Oct. 11, 1962,
H 47,119
8 Claims. (Cl. 16—163)

With doors, for example those on articles of furniture, cupboards, or desks, which are arranged very close to one another or laterally close to the wall of a room, the difficulty frequently arises that the opened door would project too far and therefore does not permit opening, which necessitates that the piece of furniture must be appropriately displaced from the adjacent piece or wall. As a result undesired dead space is formed which also is difficult to keep clean. These difficulties apply also to a greater extent in the modern kitchen, wherein separate table-like cabinets are placed very close to one another. In such cases no intermediate space should exist between the sides of adjacent articles. Furthermore, adjacent doors should not block each other. Thus there exists the problem of construction of doors for such purposes that they will not project during swinging beyond the side contour of the article of furniture.

In addition there is also the requirement of keeping the hinged parts of the door invisible from the outside.

A series of structural proposals have already been made which consists essentially in displacing the joint or hinge of the door to the inside thereof as close as possible to the outermost corner of the cross section of the door.

These constructions fail however because of the fundamental deficiency that the desired result can only approximately be attained, that a special chamber of the door edge must be made so that it will not press against the body of the article of furniture during pivoting, and that the nearer the hinge axis is brought to the outer wall of the door, the thinner must be the wall part, which results in further constructional difficulties.

It is an object of the present invention to produce a hinge with all its parts sufficiently far within the body of the door and which still makes it possible to permit opening without passing beyond the side plan of the article of furniture. This is attained by providing a hinge system constructed with hinge arms (a, b, c, d) having at least four hinge points, two adjacent hinge points being firmly connected with one structural part, for example, with the body of the article of furniture, the other two being firmly connected with the other structural part, for example with the door.

The invention is further disclosed with reference to the accompanying drawings which illustrate several embodiments and details.

Figure 28:
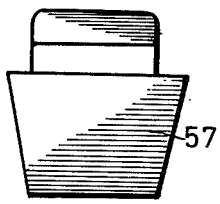
Figure 24:
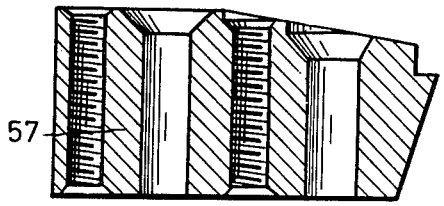
Figure 10:
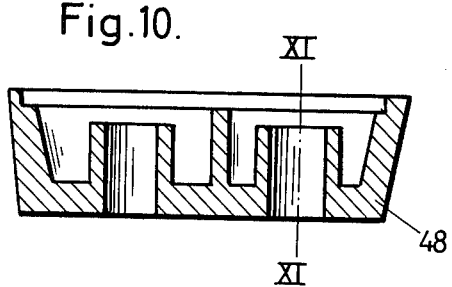
Figure 11:
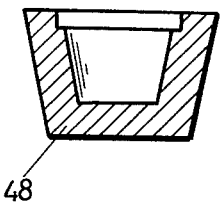
Figure 12:
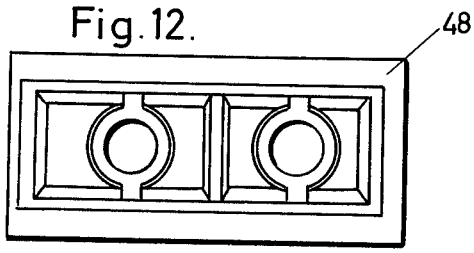
Figure 13:
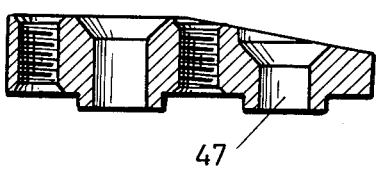
Figure 16:
Figure 14:
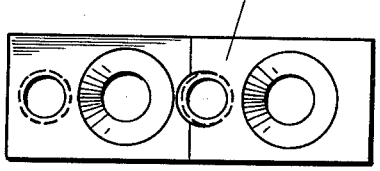
Figure 15:
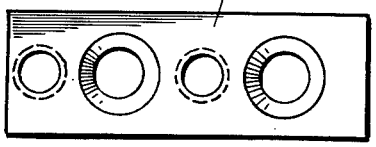
Figure 19:
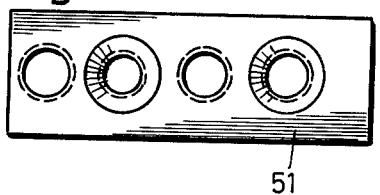
Figure 25:
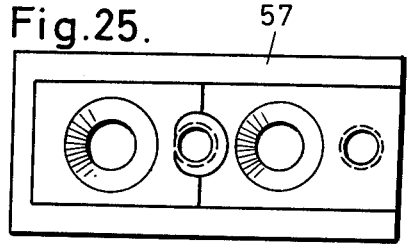
Figure 17:
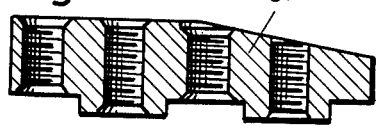
Figure 20:
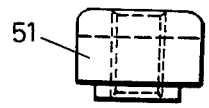
Figure 18:
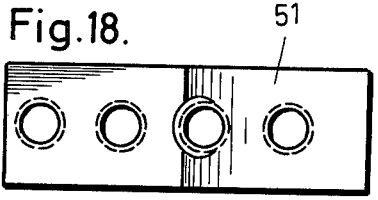
Figure 26:
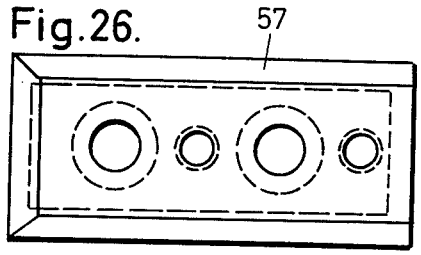
Figure 21:
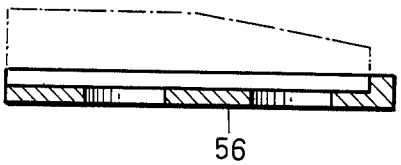
Figure 22:
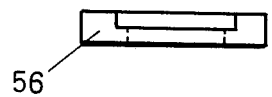
Figure 23:
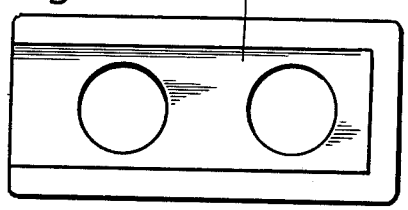
Figure 27:
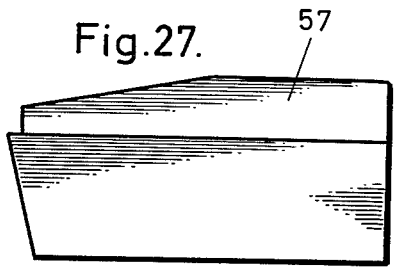
Figure 42:
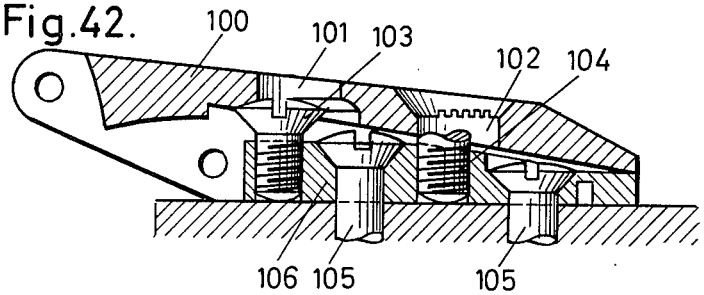
Figure 43:
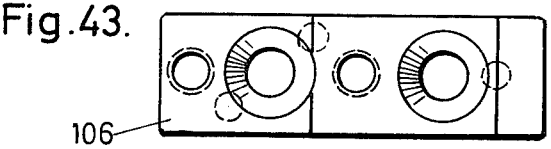
Figure 44:
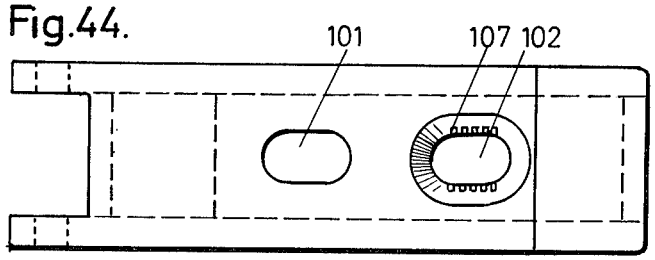
Figure 45:
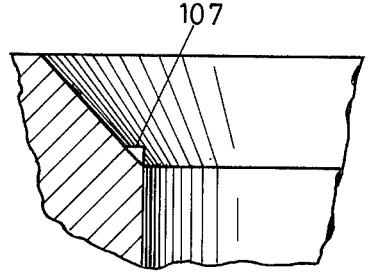

In the drawings,

FIGURE 1 is a plan view in an enlarged scale of one embodiment of the new hinge arrangement with an intermediate housing and with the adjacent furniture and door parts partially in section, FIGURE 2 is a longitudinal section of the door supporting member for the arrangement according to FIGURE 1, FIGURE 2a is a section through the attachment shown in FIGURE 2, FIGURE 3 is a plan view of the intermediate housing of the hinge arrangement shown in FIGURE 1, FIGURE 3a is a section through the intermediate housing shown in FIGURE 3, FIGURE 4 is a section in an enlarged scale of the open position of a hinge according to the invention, having a modified door supporting member, FIGURE 5 is a side view of the intermediate housing of FIGURE 4, partly sectioned, FIGURE 6 is a plan view of the intermediate housing according to FIGURE 5, FIGURES 7 and 8 are plan views of the two hinge arms, FIGURE 9 is a section through a hinge arrangement according to the invention in an article of furniture having a center wall, FIGURE 10 is a section of the intermediate body used in FIGURE 9, FIGURE 11 is a section along the line XI—XI of FIGURE 10, FIGURE 12 is a plan view of the body shown in FIGURE 10, FIGURE 13 is a section of the accompanying adjustment plate, shown in FIGURE 9, FIGURE 14 is a plan view of the adjustment plate, FIGURE 15 is the view from below of said plate, FIGURE 16 is a side view of the adjustment plate, FIGURE 17 is a section of the adjustment plate on the other side of the center wall of FIGURE 9, FIGURE 18 is a plan view of the plate according to FIGURE 17, FIGURE 19 is the view from below of the plate according to FIGURE 17, FIGURE 20 is the front view of the plate according to FIGURE 17, FIGURE 21 is a section of another modification of the intermediate body shown in FIGURE 10, FIGURE 22 is the front view of the plate according to FIGURE 21, FIGURE 23 is a plan view of the plate according to FIGURE 21, FIGURE 24 is a section of a further modification of an adjustment and intermediate plate, as shown in FIGURES 10 and 13, formed in one piece, FIGURE 25 is the plan view of the plate according to FIGURE 24, FIGURE 26 is the view from below of the plate according to FIGURE 24, FIGURE 27 is the side view of the plate according to FIGURE 24, FIGURE 28 is the front view of the plate according to FIGURE 24, FIGURE 29 is a section of a hinge housing for doors made entirely of plastics material with the adjacent parts of the doors also made of plastics, taken along the line XXIX—XXIX of FIGURE 30, FIGURE 30 is a plan view of the arrangement according to FIGURE 29, FIGURE 31 is a section of the hinge housing along the line XXXI—XXXI of FIGURE 35, FIGURE 32 is a section along the line XXXII—XXXII of FIGURE 35, FIGURE 33 is a section along the line XXXIII—XXXIII of FIGURE 35, FIGURE 34 is a section along the line XXXIV—XXXIV of FIGURE 32, FIGURE 35 is a plan view of the housing according to FIGURES 29 to 34, FIGURE 36 is a longitudinal section of a hinge with a link parallelogram, adjacent furniture parts and with an intermediate housing, FIGURE 37 is a plan view, partly sectioned, of the intermediate housing of FIGURE 36 in a plane perpendicular to FIGURE 36, FIGURE 38 is a plan view partly sectioned, of the hinge housing of FIGURE 36, FIGURE 39 is a partial section of the intermediate housing along the line XXXIX—XXXIX of FIGURE 38, FIGURE 40 is a partial section of the hinge housing along the line XXXX—XXXX of FIGURE 38, FIGURE 41 is a section of the combined intermediate and hinge housing along the line XXXXI—XXXXI of FIGURES 37 and 38, FIGURES 42 to 45 are another modification of the furniture wall attachment shown in FIGURES 1, 4 and 9.

In FIGURE 1 reference numeral 1 represents the side wall of an article of furniture, for example, a kitchen cupboard which is closed by means of a door 2. FIGURE 1 shows the door 2 in the closed position. To the inside of the furniture wall 1 there is secured by means of screws 4 and 5 a bracket 3 having a free projecting end 6. This member 3, 6 consists of a sloping channel section as will be more clearly seen from FIGURE 2. The flanges 7 and 8 of the channel have hinge centers 9 and 10 with corresponding pins to which the link arms 11 and 12 are linked. The arm 11 is curved in such manner so that it does not contact the article of furniture 1 but, in the fully opened position of the door has a proper stop on the arm 6 of bracket 3.

The ends 13, 14 of the link arms 11 and 12 are mounted on pins 15 and 16 which are located in the intermediate housing 17. The structure of the intermediate housing 17 is more clearly shown in FIGURE 3. The cross section of the housing is cylindrical so that it can be easily pushed from inside into a corresponding bore 18 of the door body 2. It can thus be inserted in the bore in any position of rotation and is held securely in this position by suitable cylindrical bolts 21 and 22 which are inserted, mostly by screwing into expanding bores 19 and 20 which are slightly tapered. In case of plastics material the corresponding thread is cut by the screw itself in the plastics material. The bolts can be screwed in or cut as often as required. Practical experiments have shown that the expanding fastening is satisfactory in that undesired loosening is substantially excluded.

The intermediate housing 17 has an internal recess 23 for the link arms 11 and 12, which preferably are made of strong sheet metal.

The distance of the rear side 2' of the door 2 from the side plan 1' in the closed condition of the door as shown in FIGURE 1 amounts to about 7.5 units (3 mms.) and can be held without difficulty or even can be rendered as little recognizable as possible.

If the center distances of the hinge centers of the link arms or of the pivot centers have the relative dimensions $a=19$, $b=46$, $c=45$, $d=42$ units as based on the drawing (1 unit for example=0.4 mms.) then the corners $e$ and $f$ which are particularly involved in the present problem describe paths illustrated by the curves $g$ and $h$ (FIGURE 1). As it can be seen from these graph lines, the door 2 very rapidly moves away from the front surface of the article of furniture 1 whereby the corner $e$ always remains sufficiently spaced from the side plan 1' of the furniture in order to render a completely uninhibited swing of the door up to a 90° to 93° arc possible.

For aligning of the door 2 with respect to the article of furniture 1 according to the construction there is provided on the bracket 3 a plate 24 loosely held by screws 4 and 5, which has the same channel section as the bracket 3 so that the two channel flanges 25 and 26 of the plate 24 and the flanges 7 and 8 of the bracket 3 fit together making the inner structure invisible from the outside.

A threaded socket 27 is formed on the plate 24 in which an adjusting screw 28 is located the head 29 of which engages in a seat 30 of the bracket 3, in which a suitable aperture 31 is provided in order to be able to adjust the screw 28 by means of a screw driver inserted in the slot 32 thereof. This adjustment can be made by a slight loosening of the screws 4 and 5 and can also be made after the assembly rendering a very precise aligning of the door 2 relative to the article of furniture 1.

It is also possible to relocate the side face 1' of the article of furniture with respect to the plan of the rear side 2' of the door 2 and yet avoid protruding of the door side over the plan 1' during the swinging movement. This is made possible by displacing of the center 10 to the position 10', by shortening of the hinge arm $c$, for example to 27 units. The corners $e$ and $f$ then will follow the graph lines $g$ and $h$, which run within the confinement of the plan 1'. Furthermore, it is possible to make not only outwardly swinging doors but also inwardly swinging doors with such four hinge links; likewise by modification of the individual lengths of the hinge and by the displacement of the center positions it is feasible to attain possible further hinge movements, which can be ascertained by experiment and calculation.

In the modified embodiment according to FIGURES 4 to 8, the links 11 and 12 are similar to those of FIGURE 1. A cylindrical member 33 which is the equivalent of housing 17 in FIGURES 1, 3 and 3a, serves as the intermediate housing which has an intermediate stepped T-shaped opening 34 equivalent to the recess 23 of part 17. In the first part 34a of this opening the two hinge ends 13 and 14 of the link arms 11 and 12 are pivotally mounted on pins 15 and 16. These pins are held on the inside in bores 15' and 16' of the intermediate housing 33. Since the bore 16' lies farther to the inside of the housing 33 and since the pin 16 is being stressed in this direction, this pin bearing is logically located corresponding to the greater stress, while the bore 15' is shorter and lies farther outwards. When the door is fully opened in the outward direction the pin 15 would be stressed in an excessive manner if this is not avoided in that the link 12, which is wider in its major part 12a (FIGURE 7) than the end part 14, finds a support for its laterally extending side parts on the shoulders 37, 38 of the housing 33. The shoulders 37, 38 can run either axially to the housing 33, or, as shown, at a slight angle thereto. In any case a full support of the links has to be attained for the desired angle of swing of door 2. The ends 13 and 14 are fitted in the narrow space 34a. The part 34b is held in the center of the space 34 so that the wider parts 11a and 12a of the two links 11, 12 can move freely, while the part 34c is still wider in order to be able to receive readily in the closed position of the door 2, the end 6 of the bracket 3 with the hinge center 10.

As shown in FIGURES 7 and 8, the two links 11 and 12 are constructed substantially similar to each other with the difference that the link 11 (see FIGURES 4 and 8) is curvedly shaped in order to get around the corner of the furniture opening.

The housing 33 has on its rear side hollow spaces 35, where solid material can be spared so that a substantially equal wall thickness remains. The two expanding bores 39 and 40 equivalent to the bores 19 and 20 of housing 17 in FIGURE 3 are suitably arranged at an angle to the axial direction of the housing 33. This has the result that by inserting or screwing of the expanding screw pins or bolts 41 and 42 (illustrated by dotted lines in FIGURE 5) a double securing action on the periphery of the housing by their oblique location in the door body is attained.

Such a housing cannot be loosened even by a great force without removal of the screws from the door body.

The swinging angle which is limited by the housing 33 or by an abutment can amount to more than 90°, which is particularly advantageous in cases in which a given spacing from a wall 43 is to be fully used.

In practice it has been shown that in certain manufacturing cases in which the hinges according to the invention are used, the door and wall thicknesses of the furniture equipped with these hinges can deviate considerably from one another and that these important differences set certain limits to the insertion of the hinges in the basic form described above. It has also been proved that the holes for the hinge housing to be bored in the pieces of furniture made of plastics material, split at the edges, particularly, for example, in kitchen cabinets, where hard veneers of plastics material are being used for surface covering. In order to avoid this disadvantage the elements shown in FIGURES 9–28 are being used as connecting members with the parts of the articles of furniture.

In FIGURE 9, the housing 33 of cylindrical shape is shown which is inserted by way of an intermediate ring 44 having a flange 44′, in a corresponding cylindrical bore of the door 2. The housing 33 has the two links 11 and 12 mounted at centers 15 and 16. The link ends are linked at 9 and 10 to a member 45 which is firmly attached to a center wall 46. The connection is made by means of an adjustment plate 47 which in turn is supported by an intermediate plate 48 fixed by holding screws 49 to the center wall 46. The member 45 is shoe-like in form and is closely fitted with the adjustment plate 47. The same is being made between the latter and the intermediate plate 48, which has corresponding recesses 48′, so that the parts 45, 47, 48 are fitted with one another against relative rotation. The holding screws 49 engage through the center wall 46 an opposite-hand second intermediate plate 50 arranged on the other side of the wall with a second adjustment plate 51 thereon for a second door 52. The structure of the intermediate plate 48 is shown in FIGURES 10 to 12, that of the adjustment plate 47 in FIGURES 13 to 16 and that of the second adjustment plate 51 in FIGURES 17 to 20. These parts 45, 47, 48 (and 50, 51) are the equivalents to the bracket 3 in FIGURES 1 and 4.

The assembly is made by a screw 53 which is seated in the adjustment plate 47 (FIGURE 9), with the co-operation of a support screw 54 which also is screwed into the plate 47 and can be adjusted from the outside through an aperture 54′. By means of the screws 53 and 54 it is possible to obtain a precise and fast alignment of the door 2. For taking the load off the bolt 15, lateral abutments 37 and 38 on the housing 33 are provided, on which the sides of the link 12 rest, when the door is entirely open, thereby limiting the swinging angle of the door in a manner similar to the description above. The parts of the hinge assembly for the second door 52 are substantially mirror-images of those of the assembly for the door 2, the only difference being that the adjustment plate 51 has a thread for the screw 49.

FIGURES 21 to 23 show another modification of the intermediate plate 48 of suitably smaller dimension, while in FIGURES 24 to 28 a combined adjustment and intermediate plate 57, formed in one piece, as a modification of parts 47, 48 of FIGURE 9, is illustrated, an individual description of which is not necessary.

FIGURES 29 to 35 shown a modification for doors made of plastics material. In these figures there is a body 58 of a door made of plastics material, which has a reinforcement 59 in which a recess 60 is formed, which serves for keeping of an intermediate housing 61. The housing 61 is inserted with a close tolerance into the recess 60. It has a flange 62 which rests on the wall 63 of the reinforcement 59 and is firmly secured with this by screws 64. As it is shown in FIGURE 30, the parts 65 of the housing 61 which serves for holding of the two hinge centers 66 and 67 for the links (not illustrated) project into the fortified edge 68 of the door 58, in order to arrange the hinge centers as close as possible to the side edge of the door. The design of the links and of the remaining elements of the housing with the recesses for the corresponding parts of the links has been described in detail above and are not further described here. The flange 62 has two recesses 69, 70 (see FIGURES 29, 30 and 35) which receive two rods (not illustrated) extending across the entire width of the door giving the housewife the chance of hanging on the inside of the door any household implements.

In FIGURES 36 to 41, another modification of the invention is shown. Reference numeral 1 again is the stationary part of an article of furniture, and 2 is the movable part, for example, a door. A trough-like bracket 72 is screwed on to the stationary part 1 by means of one or more wood or metal screws 71. The bracket 72 has hinge pins 73 and 74 on which links 75 and 76 are arranged. These links are linked with hinge pins 77 and 78 on a second reversed trough-like housing 79 in such manner that the pins 73, 74, 77, 78 form a hinge parallelogram. In the position illustrated in FIGURE 36 the link arms 75, 76 are in a rest position in which the two parts 72 and 79 meet on the dividing line 80.

The part 79 is, in FIGURE 36, extended beyond the hinge pin 78 by a part 79′ which is bent at a right angle and carries at the end a hinge pin 81 which in turn also is supported in an intermediate housing 82 firmly attached to the door 2 similar to the intermediate housings 17 and 33 in FIGURES 1, 3, 4 and 9.

The arm 76 is extended beyond the pin 78 by a part 76′ projecting outwardly through an opening 83 of the housing 79 and carrying at the end thereof a hinge pin 84 to which an intermediate link 85 is joined which is mounted at the other end thereof by the pin 86 in the intermediate housing 82.

By swinging of the arms 75, 76, in FIGURE 36, in a clockwise direction the part 79 is first lifted, and by further rotation of the links comes back to a better support on part 72, see the dotted illustration in the lower part of FIGURE 36, while the door 2 swings through an angle of 90° and moves into the equally dotted illustrated position.

The intermediate housing 82 has the form of a semi-circular sleeve with a flanged collar 87 in which elongated holes 88 are provided, as shown in FIGURE 38. They serve for attaching of the housing 82 to a bracket 89, which like the housing 82 has a semi-circular sleeve form (with base 89′), so that it can be inserted from the inside of the door 2 in a recess 90.

As it can be seen from FIGURE 36, the recess does not extend through the door, but leaves a wall 2″, whereby the outside surface of the door is not interrupted. A tongue-like extension 91 is driven during the assembly into the material of the door 2, which preferably consists of wood, so that the bracket 89 is safely anchored on this side. The final securing in the door is made with inclined bores 92, and by expanding bolts 93 therein, which are driven into the material of the door. Threaded holes 94 are provided for the screws (not illustrated) which through the elongated holes 88 hold the housing 82. The bracket 89 has a recess 95 at the top and a wedge-like groove 96 formed in the base of the recess 95, which is aligned with an opening 97 in the flange 87 of the housing 82. As indicated in FIGURE 41 by dotted lines a screw driver 98 can be inserted through the opening 97 into the groove 96, permitting a displacement of the housing 82 with respect to the firmly secured bracket 89 in a horizontal direction, for example to an extent of 4 mm. Hereby it is posible in a simple manner to align horizontally and vertically the upper and lower hinges of a door correctly within the existing finishing tolerances.

This takes place at the place of assembly so that during transportation the hinges can be removed, and that protruding of parts and potential damage to or scratches of the furniture parts is avoided. Only the non-protruding bracket 89 can be left inserted.

As indicated in dotted lines in FIGURE 36 metal inserts 99 are driven into the furniture part 1 in order to be able to unlock and to lock the securing screws 71.

FIGURES 42 to 45 show a modification of the bracket 3 of FIGURES 1 and 3 and of the combination of the parts 45, 47, 48 of FIGURE 9 in which for aligning of the door in addition to height adjustment of the part attached to the article of furniture, there is also provided a possibility of a lateral adjustment. To this extent longitudinal openings 101, 102 are provided in the bracket 100, the opening 101 being used for acting on the support screw 103, while through the opening 102 the tightening screw 104 engages with the base plate 106 held by screws 105. In order to avoid an involuntary displacement of the bracket 100 by the operation of the door, small cams 107 are formed in the longitudinal aperture 102 at the lower edges of the countersink which on tightening of the screw 104 are deformed to such an extent that they clamp the screw and so ensure a firm seating. Even if at a later time an adjustment should be necessary this is still possible since at each new tightening another deformation will occur.

As it is obvious, this hinge can be manufactured in a particularly simple and economic manner and is operated easily and reliably.

I claim:

1. A hinge for a door having a recess on the inside thereof, said door swingably arranged on an article of furniture or the like having a side wall provided with a sectional profile and a bracket on the inside of said side wall, said bracket having a free end; said hinge comprising:
   (a) two links connecting said door and said bracket, said links having ends arranged in pairs adjacent to one another,
   (b) first means embedded in said recess of said door, said first means having first pivot means therein, one pair of said adjacent link ends being pivotally arranged on said first pivot means, and
   (c) second pivot means on said free end of said bracket, the other pair of said adjacent link ends being pivotally arranged on said second pivot means, the distance between said first pivot means of said one pair of said adjacent links being substantially two-fifths of the distance between said second pivot means of said other pair of said adjacent links, the length of said links being substantially equal, and said first and said second pivot means and said links being located outside of said sectional profile during the swinging movement of said door.

2. A hinge for a door having a recess on the inside thereof, said door swingably arranged on an article of furniture or the like having a side wall provided with a sectional profile and a bracket on the inside of said side wall, said bracket having a free end; said hinge comprising:
   (a) two links connecting said door and said bracket, said links consisting of an outer link and an inner link, said links having ends arranged in pairs adjacent to one another,
   (b) first means embedded in said recess of said door, said first means having first pivot means therein, one pair of said adjacent link ends being pivotally arranged on said first pivot means,
   (c) second pivot means on said free end of said bracket, the other pair of said adjacent link ends being pivotally arranged on said second pivot means, and
   (d) the distance between said link ends of said one pair of said adjacent link ends being 19 units of length, the distance between said link ends of said other pair of said adjacent link ends being 45 units of length, the length of one link between its pivots being 46 units, the length of the other link between its pivots being 42 units, and said outer link lying substantially parallel to said door when the same is in closed position, the line extending between the ends of said outer link enclosing an angle of substantially 70° with the line extending between said second pivot means.

3. A hinge for a door having a recess on the inside thereof, said door swingably arranged on an article of furniture or the like having a side wall provided with a sectional profile and a bracket on the inside of said side wall, said bracket having a free end; said hinge comprising:
   (a) two links connecting said door and said bracket, said links consisting of an outer link and an inner link, said links having ends arranged in pairs adjacent to one another,
   (b) first means embedded in said recess of said door, said first means having first pivot means therein, one pair of said adjacent link ends being pivotally arranged on said first pivot means,
   (c) said bracket consisting of a shoe-like channel structure, said channel structure having flanges, said flanges extending to said free end of said bracket,
   (d) second pivot means on said flanges, the other pair of said adjacent link ends being pivotally arranged on said second pivot means, and
   (e) the distance between said link ends of said one pair of said adjacent link ends being 19 units of length, the distance between said link ends of the other pair of said adjacent link ends being 45 units of length, the length of said one link between its pivots being 46 units, the length of said other link between its pivots being 42 units, and said outer link lying substantially parallel to said door when the same is in closed position, the line extending between the ends of said outer link enclosing an angle of substantially 70° with the line extending between said second pivot means.

4. A hinge for a door according to claim 3, and said channel structure having an intermediate plate and an adjustment plate intermediate said bracket and said side wall, said adjustment plate securing said intermediate plate against rotation.

5. A hinge for a door according to claim 4, and said adjustment plate having an adjusting screw abutting against the inside of said channel structure and having a locking screw securingly pressing said channel structure against the head of said adjusting screw.

6. A hinge for a door having a recess on the inside thereof, said door swingably arranged on an article of furniture or the like having a side wall provided with a sectional profile and a bracket on the inside of said side wall, said bracket having a free end; said hinge comprising:
   (a) two links connecting said door and said bracket, said links consisting of an outer link and an inner link, said links having ends arranged in pairs adjacent to one another,
   (b) first means embedded in said recess of said door, said first means having first pivot means therein, one pair of said adjacent link ends being pivotally arranged on said first pivot means,
   (c) said bracket consisting of a shoe-like channel structure, said channel structure having flanges, said flanges extending to said free end of said bracket,
   (d) second pivot means on said flanges, the other pair of said adjacent link ends being pivotally arranged on said second pivot means, and the dimensions of said article of furniture and the associated door thereof being such that
   (e) the distance between the corresponding pairs of said adjacent link ends, the length of said corresponding links and the location of said first and said second pivot means is such that no part of said door projects during a full swinging movement beyond said side wall of said article of furniture.

7. A hinge for a door having a cylindrical recess on the inside thereof, said door swingably arranged on an article of furniture or the like having a side wall provided with a sectional profile and a bracket on the inside of said side wall, said bracket having a free end; said hinge comprising:
   (a) two links connecting said door and said bracket, said links consisting of an outer link and an inner link, said links having ends arranged in pairs adjacent to one another,
   (b) a cylindrical intermediate housing embedded in said cylindrical recess, said housing having first pivot means therein, one pair of said adjacent link ends being pivotally arranged on said first pivot means, (c) said bracket consisting of a shoe-like channel structure, said channel structure having flanges, said flanges extending to said free end of said bracket, said free end of said bracket projecting into said cylindrical housing when the door is in closed position, (d) second pivot means on said flanges, the other pair of said adjacent link ends being pivotally arranged on said second pivot means and the dimensions of the article of furniture and its associated door being such that (e) the distance between said link ends of said one pair of said adjacent link ends is 19 units of length, the distance between said link ends of said other pair of said adjacent link ends is 45 units of length, the length of said one link between its pivots is 46 units, the length of said other link between its pivots is 42 units, and (f) said outer link lying substantially parallel to said door when the same is in the closed position, the line extending between the ends of said outer link enclosing an angle of substantially 70° with the line extending between said second pivot means.

8. A hinge for a door having a cylindrical recess on the inside thereof, said door swingably arranged on an article of furniture or the like having a side wall provided with a sectional profile and a bracket on the inside of said side wall, said bracket having a free end; said hinge comprising:

(a) two links connecting said door and said bracket, said links consisting of an outer link and an inner link, said links having ends arranged in pairs adjacent to one another, (b) a cylindrical intermediate housing embedded in said cylindrical recess in said door, said housing having first pivot means therein, one pair of said adjacent link ends being pivotally arranged on said first pivot means, (c) said bracket consisting of a shoe-like channel structure, said channel structure having flanges, said flanges extending to said free end of said bracket, said free end of said bracket projecting into said cylindrical housing when the door is in closed position, (d) second pivot means on said flanges, the other pair of said adjacent link ends being pivotally arranged on said second pivot means, and the dimensions of the article of furniture and its associated door being such that (e) the distance between the corresponding pairs of said adjacent link ends, the length of said corresponding links and the location of said first and said second pivot means is such that no part of said door projects during a full swinging movement beyond said side wall of said article of furniture.

References Cited by the Examiner

UNITED STATES PATENTS

| 1,484,093 | 2/1924 | Soss | 16—164 |
| 2,051,726 | 8/1936 | Lefevre | 16—164 |
| 2,063,686 | 12/1936 | Lefevre. | |
| 2,164,757 | 7/1939 | Soss | 16—164 |
| 2,674,761 | 4/1954 | Weiss | 16—164 |
| 2,744,284 | 5/1956 | McMillan | 16—131 |

FOREIGN PATENTS

| 1,082,524 | 5/1960 | Germany. |
| 662,716 | 2/1950 | Great Britain. |

DONLEY J. STOCKING, *Primary Examiner.*

M. HENSON WOOD, Jr., *Examiner.*